United States Patent [19]
Fowler et al.

[11] Patent Number: 5,998,893
[45] Date of Patent: Dec. 7, 1999

[54] INTEGRAL HEAT SINK AND FAN RECTIFIER ASSEMBLY

[76] Inventors: John T. Fowler, 122 Catalina Dr.;
Darrell R. Morrison, 204 Cameo La., both of Mankato, Minn. 56001

[21] Appl. No.: 09/204,672

[22] Filed: Dec. 3, 1998

[51] Int. Cl.⁶ .................................................. H02K 11/00
[52] U.S. Cl. ........................................ 310/68 R; 310/68 D
[58] Field of Search ..................... 310/68 D, 71, 310/72, 68 R; 257/722

[56] References Cited

U.S. PATENT DOCUMENTS

| | | | |
|---|---|---|---|
| 2,445,582 | 7/1948 | Melville | 174/16.1 |
| 3,011,105 | 11/1961 | Le Blanc | 257/722 |
| 3,305,704 | 2/1967 | Battista | 361/695 |
| 3,825,767 | 7/1974 | Shields | 307/100 |
| 3,829,725 | 8/1974 | Petersen et al. | 310/68 D |
| 3,831,062 | 8/1974 | Haug et al. | 361/710 |
| 3,838,303 | 9/1974 | Ernst | 310/68 D |
| 3,942,586 | 3/1976 | Fries | 165/104.33 |
| 4,079,276 | 3/1978 | Kuter | 310/68 D |
| 4,144,932 | 3/1979 | Voigt | 165/80.3 |
| 4,288,711 | 9/1981 | Hagenlocher et al. | 310/68 D |
| 4,329,603 | 5/1982 | Ballard | 310/61 |
| 4,633,371 | 12/1986 | Nagy et al. | 361/699 |
| 4,670,678 | 6/1987 | Jager et al. | 310/68 D |
| 5,150,278 | 9/1992 | Lynes et al. | 361/690 |
| 5,335,143 | 8/1994 | Maling, Jr. et al. | 361/694 |
| 5,785,116 | 7/1998 | Wagner | 165/80.3 |
| 5,828,564 | 10/1998 | Mori et al. | 363/141 |

*Primary Examiner*—Nestor Ramirez
*Assistant Examiner*—Joseph Waks

[57] ABSTRACT

An integral heat sink and fan rectifier assembly comprises a disk fastened to a rotor of a synchronous motor or generator, the disk having a central bore, a plurality of fan blades disposed on the outer periphery and a circular array of recesses that receive insulation encapsulated rectifier units that are fastened to the disk and a have a heat transfer plates that engage the bottom of the recesses to transfer heat to the disk which conducts the transferred heat to the fan blades, which transfer the heat to the cooling air as rotor rotates and blows cooling air through a portion of the motor or generator.

7 Claims, 5 Drawing Sheets

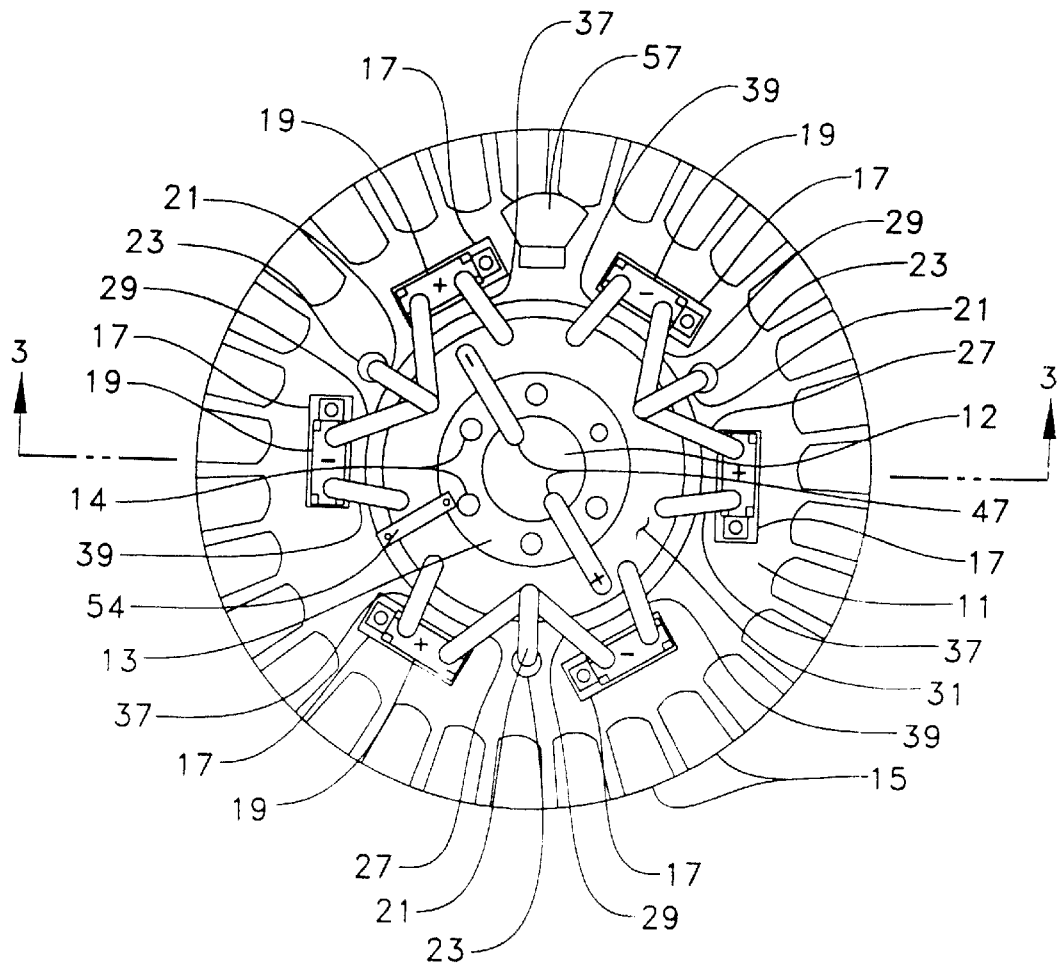
Fig_2_
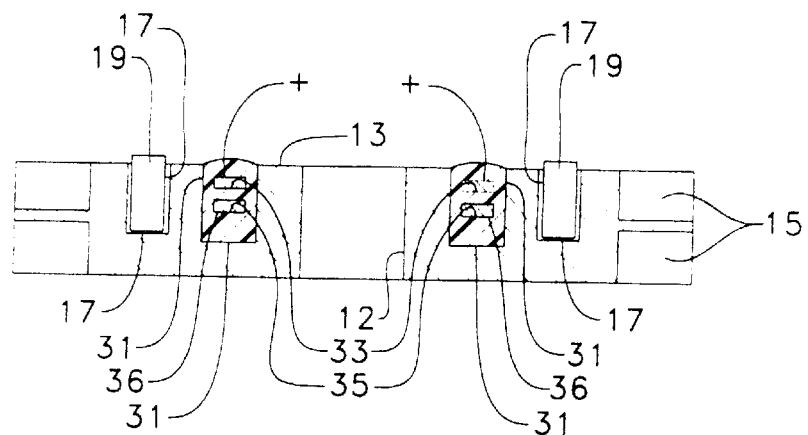
Fig_3_

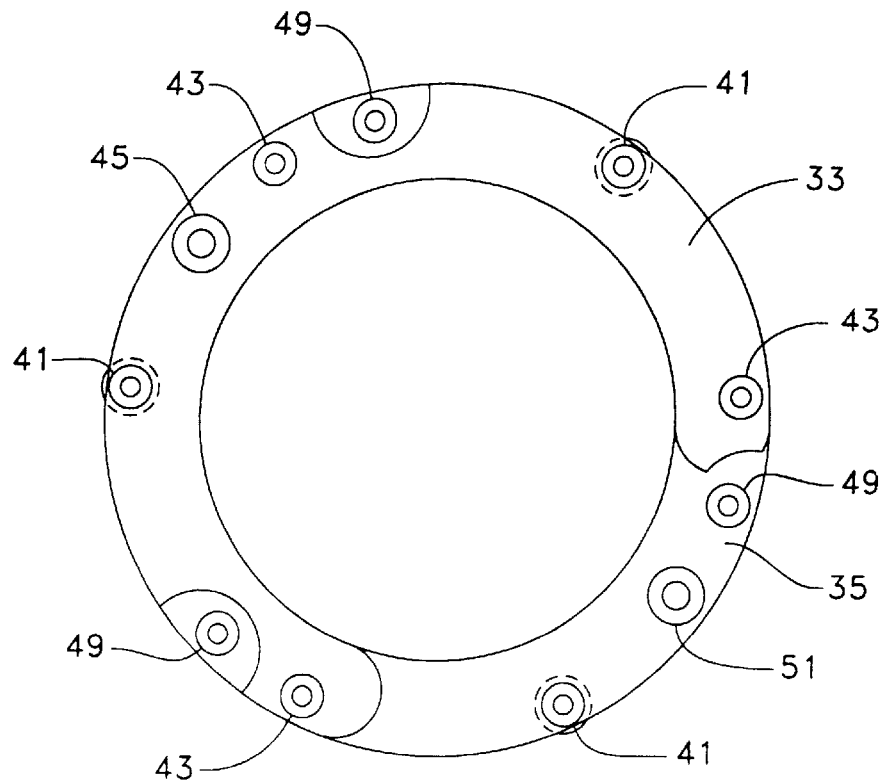
Fig_4_
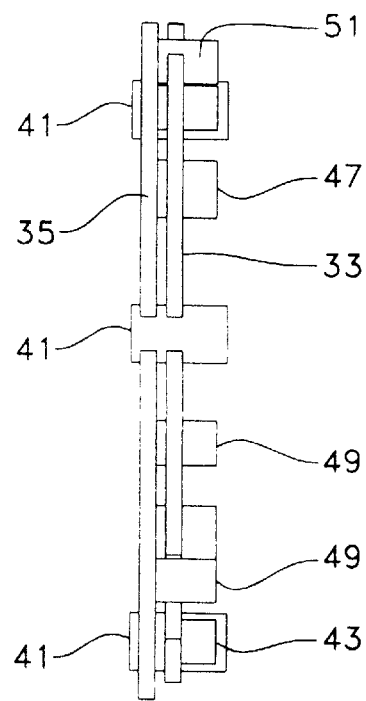
Fig_5_

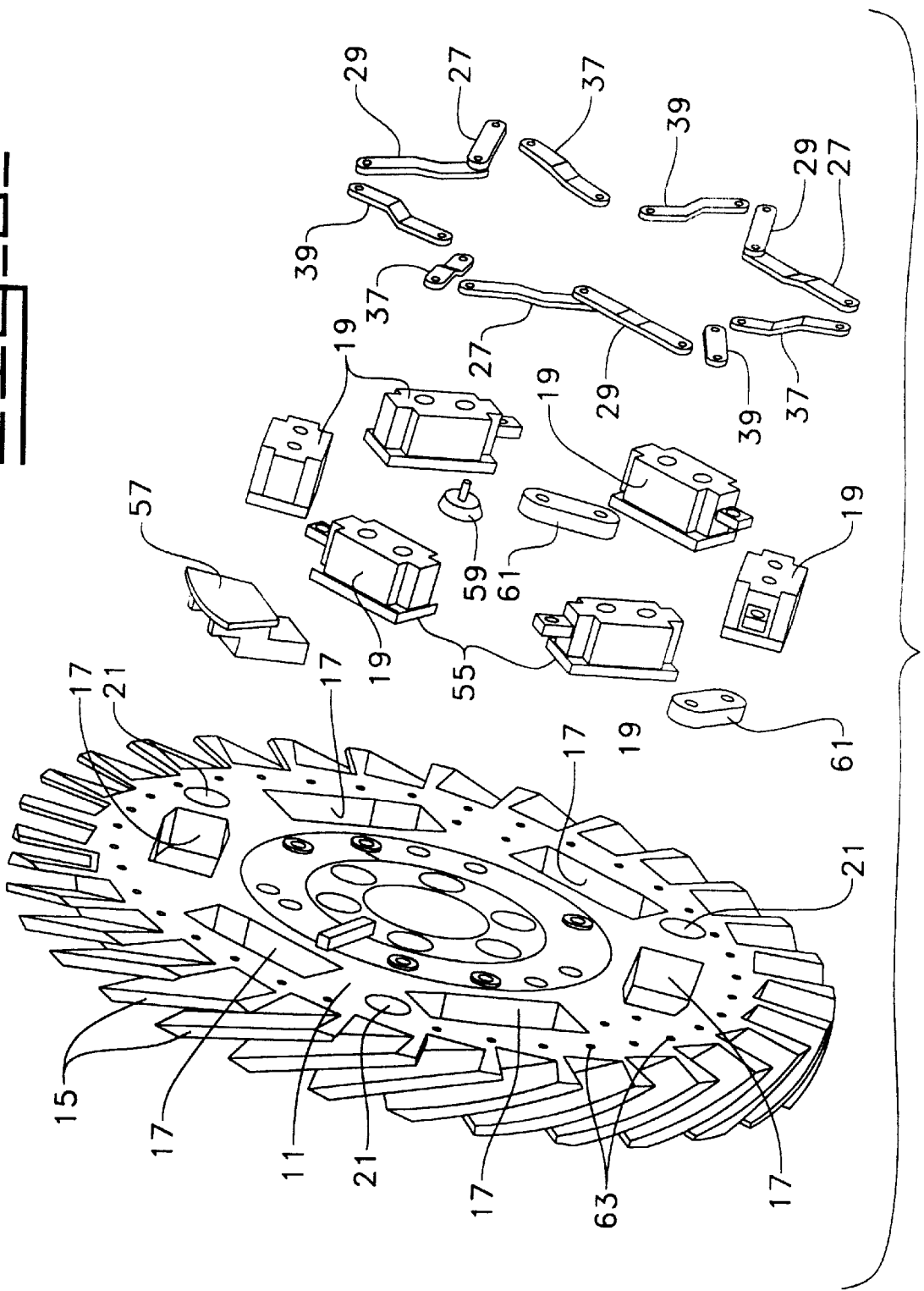
Fig_6

Fig_7_
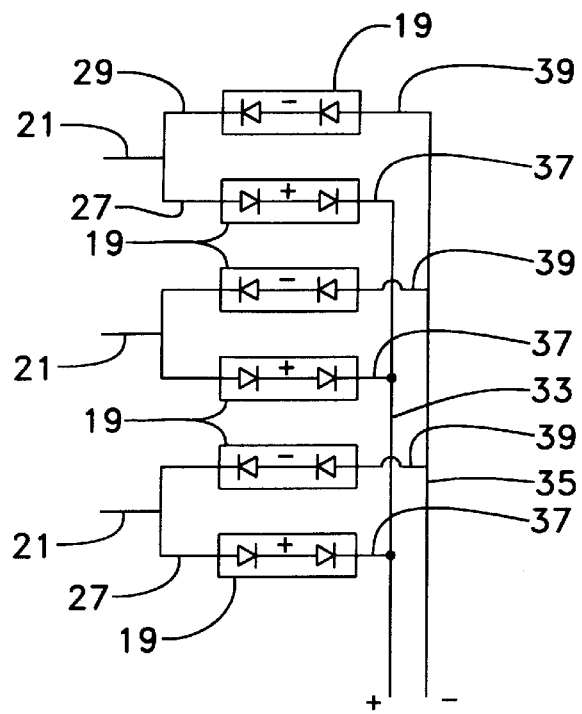
Fig_8_
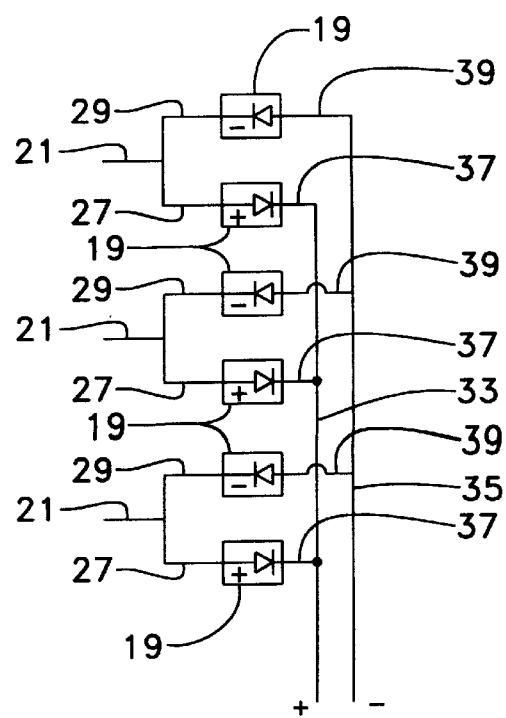

INTEGRAL HEAT SINK AND FAN RECTIFIER ASSEMBLY

TECHNICAL FIELD

The invention relates to electrical machinery and more particularly to an integral heat sink and fan rectifier assembly for synchronous motors and generators.

BACKGROUND ART

Rectifiers which convert AC to DC produce heat due to the resistance of the rectifier. This heat must be dissipated as fast as it is generated or the rectifiers will overheat and fail. U.S. Pat. No. 3,011,105 provides a heat exchange frame having a central cylindrical portion with a plurality of cooling arms extending outwardly from the outer surface thereof in longitudinal planes. A rectifier is disposed on each arm to transfer heat to the arm.

DISCLOSURE OF THE INVENTION

In general, an integrated heat sink and fan rectifier assembly for an electrical machine having a rotor with a central bore, when made in accordance with this invention, comprises a disk fastened to one end of the rotor. The disk has a central bore that registers with the central bore of the rotor, a plurality of air foil shaped blades disposed on the outer periphery forming a fan for cooling the machine, and a plurality of recesses disposed in a circular array on one side of the disk. A plurality of insulation encapsulated rectifier units are disposed in recesses. The rectifier units are fastened to the disk. Each rectifier unit has a heat transfer plate which engages the disk within the recess to transfer heat generated within the rectifier unit to the disk, which conducts the transferred heat to the blades, which are cooled by the cooling air flowing over the blades as the rotor rotates.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

FIG. 2 is a plan view of the integrated heat sink and fan rectifier assembly;

FIG. 3 is a sectional view taken on line III—III of FIG. 2;

FIG. 4 is a plan view of a pair of DC collector conductors;

FIG. 5 is an elevational view of the DC collector conductors;

FIG. 6 is an exploded view of the integrated heat sink and fan rectifier assembly;

FIG. 7 is a circuit diagram of the rectifier units having two diodes in series; and FIG. 8 is a circuit diagram of the rectifier units having a single diode.

BEST MODE FOR CARRYING OUT THE INVENTION

Figure 1:
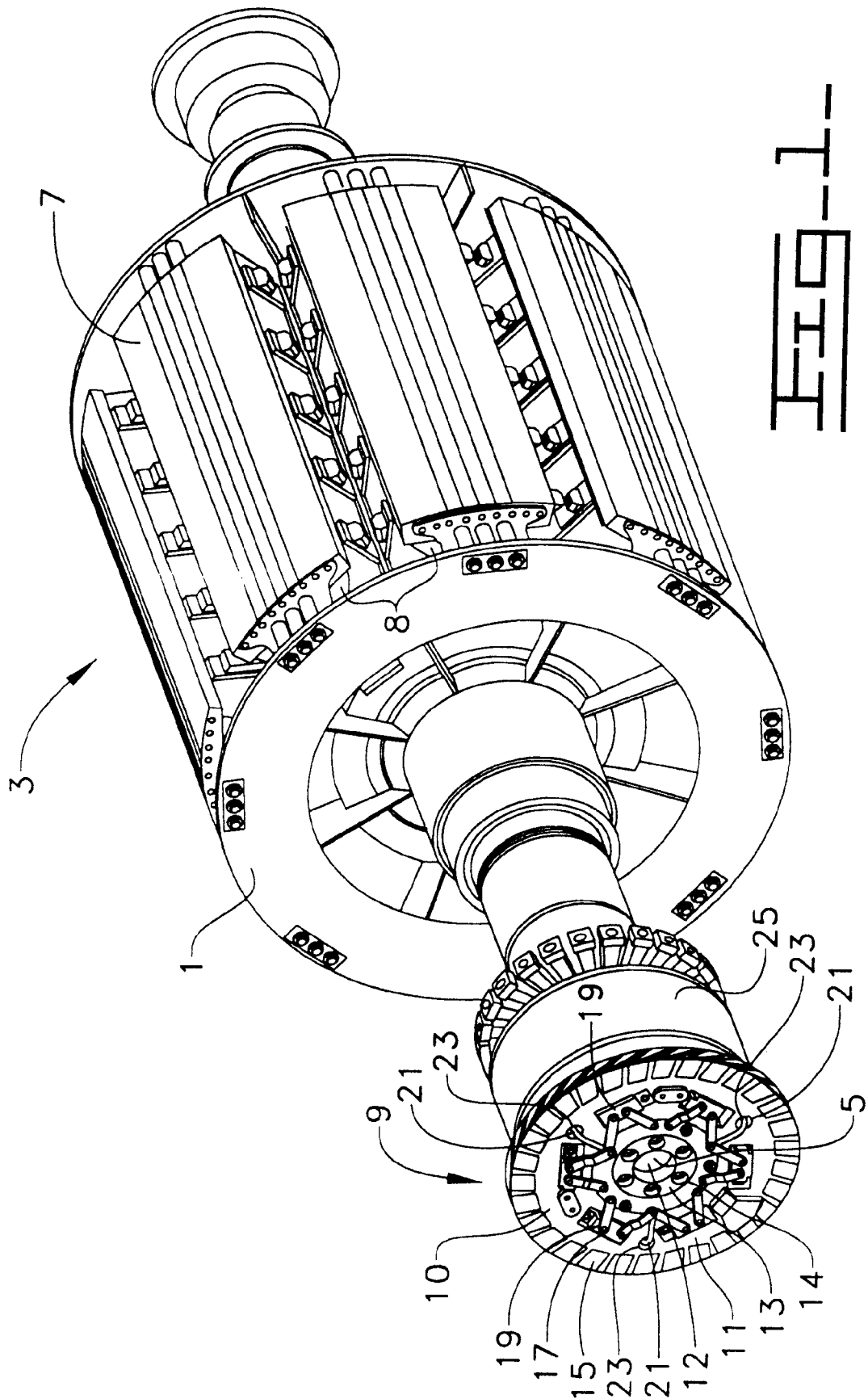
FIG. 1 is an isometric view of a rotor for a synchronous motor or generator having an integrated heat sink and fan rectifier assembly made in accordance with this invention.

Referring now to the drawings in detail and in particular to FIG. 1, there is shown a rotor 1 for an electrical machine 3 such a synchronous generator or motor. The rotor 1 has a central bore 5 and a plurality of electromagnetic poles 7 encircled by pole windings 8 through which DC current flows to form the electromagnetic poles 7. An exciter rotor portion 9 is disposed on one end of the rotor 1. The exciter rotor portion 9 has an integrated heat sink and rectifier assembly 10 disposed on the outboard end. The assembly 10 comprises a disk 11 having a central bore 12, which registers with the bore 5 in the rotor 1. The disk 11 has a hub 13 circumferentially disposed around the bore 12 with a plurality of through holes 14 for fastening the disk 11 to the rotor 1. Bolts or other fasteners (not shown) are utilized to fasten the disk 11 to the rotor 1. A plurality of airfoil shaped fan blades 15 are disposed on the outer periphery of the disk 11. The fan blades 15 form a fan that blows cooling air through the exciter of which only the rotor portion 9 is shown. The disk 11 has a plurality of recesses 17 disposed in a circular array on one side of the disk 11. Insulation encapsulated rectifier units 19 are disposed in the recesses 15 and are fastened to the disk 11 by bolts or other fasteners (not shown). The motor or generator rotor 1 is preferably, but not necessarily, utilized in a three phase machine. The three phase AC current generated in the exciter rotor 9 is supplied to six rectifier units 19, three of which only pass positive current and the other three only pass negative current converting the AC or alternating current to DC or direct current. The AC current is supplied to the rectifier units 19 through three leads 21 that pass through three holes 23 disposed in the disk 11 and connect to windings 25 (not shown in detail) that rotate adjacent to electromagnetic poles in a stator (not shown).

Referring now to FIG. 2 and 3 the lead lines 21 are electrically connected to link connectors 27 and 29. The link connectors 27 are electrically connected to the rectifier units 19 shown as (+) and pass only positive current. The link connectors 29 are electrically connected to the rectifier units 19 shown as (−) and pass only negative current. Disposed in a circular recess 31 in one side of the disk 11 are two collector conductors or rings 33 and 35 which are electrically insulated from each other and from the disk 11. The collector conductor 33 collects the positive current from the rectifier units 19 (+) and collector conductor 35 collects negative current from the rectifier units 19 (−). Link connectors 37 and 39, respectively, electrically connect the positive and negative output of the rectifier units 19 to the collector rings 33 and 35. The collector ring conductors 33 and 35 are installed in the circular recess 31. An insulating spacer material 36 is molded around the rings 33 and 35 filling all the space between the collector rings 33 and 35 and the recess 31 and electrically insulating the collector rings 33 and 35 from each other and from the disk 11.

Referring now to FIGS. 4 and 5 the positive collector conductor 33 over lays the negative collector conductor 35, which is a complete ring while the positive collector conductor 33 is only a partial ring. The collector conductors 33 and 35 are held apart by insulator pins 41 which also holds the collector conductor 35 off the bottom of the circular recess 31. The positive collector conductor 33 has three studs 43 that are electrically connected to the link connectors 37 (shown in FIG. 2) and a stud 45 that is electrically connected to a positive main field lead 47 (shown in FIG. 2) that passes through the central bore 12 in the disk 11 and into the rotor 1. The negative collector conductor 35 has three studs 49 that are electrically connected to the link connectors 39 (shown in FIG. 2) and a stud 51 that is electrically connected to a negative main field lead 53 (shown in FIG. 2) that passes through the central bore 12 in the disk 11 and into the rotor 1. The insulating spacer material 36 shown in FIG. 3 cooperates with the pins 41 to hold the collector conductors 33 and 35 in the recess 31 so as not to contact the side walls and properly positions the studs 43 and 49 relative to the rectifier units 19 to which they are electrically connected.

Referring now to FIG. 6 there is shown an exploded view of the integrated heat sink and rectifier assembly 10. The disk 11 is preferably made of aluminum as it is a good conductor of heat and it is easy to machine the air foil shaped fan blades 15 and recesses 17 and 31 therein. The rectifier units 19 also have a heat transfer plate 55 disposed on one side. The heat transfer plate 55 is electrically isolated from the diodes, but closely associated therewith to provide a heat transfer plate 55 that will rapidly remove heat from the diodes. The heat transfer plate 55 engages the disk 11 within the associated recess 17 to rapidly transfer the heat generated by the resistance of the diodes to the disk 11. Being made of aluminum the disk 11 conducts the transferred heat to the airfoil shaped fan blades 15. As the disk is rotated with the rotor 1 the air foil shaped fan blades blow cooling air through the exciter rotor portion 9 and an exciter stator portion (not shown). The cooling air also cools the fan blades 15 removing the heat conducted to the fan blades 15 from the heat transfer plates 55 on the rectifier units 19. While in this embodiment the heat transfer plates are positioned to engage the bottom of the recesses 17 it is understood that the heat transfer plates 55 could also be made and positioned to transfer heat to any portion of the recesses 17. A ground fault detector 57 is also disposed on the disk 11 to protect against the energized components making electrical contact with the rotor 1. A surge protector 59 is also mounted on the disk 11. Counter weights 61 are fastened to the disk 11 and cooperate with a plurality of balance holes 63 disposed adjacent the blades 15 to balance the rotor 1. The recesses 17 are sufficiently deep so that the center of gravity of the rectifier units 19 is disposed within the recesses 17 so the rectifier units 19 do not have a tendency to fly out of the disk 11 at high rotating speeds.

Referring now to FIGS. 7 and 8 three phase AC current is supplied through the three AC leads 21. The conductor links 27 and 29 electrically connect the AC leads 21, respectively, to the (+) and (−) rectifier units 19. The (+) and (−) rectifier units 19 are, respectively, electrically connected to the collector conductors 33 and 35 by the link connectors 37 and 39. The rectifier units 19 in FIG. 7 are made with two diodes disposed in series to provide redundancy within each rectifier unit 19. However it is understood that the rectifier units 19 may be made with a single diode disposed therein as shown in FIG. 8.

While the preferred embodiments described herein set forth the best mode to practice this invention presently contemplated by the inventors, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

Industrial Applicability

An integrated heat sink and fan rectifier assembly for a synchronous motor or generator, when made in accordance with this invention advantageously provides rectifier units with an electrically insulated heat transfer surface that can be assembled on a common heat sink that rapidly conducts heat away from the rectifiers and dissipates the heat through the fan blades to the cooling air. The position on the end of the rotor makes all electrical components of the rectifier assembly very accessible for service. Thus reducing outage time for diode inspection and replacement, if necessary.

What is claimed is:

1. An integrated heat sink and fan rectifier assembly for an electrical alternating current machine having at least one phase and at least two rectifier units connected to each phase, one rectifier unit allows positive current to flow there through and the other rectifier unit allows negative current to flow there through to convert the alternating current to direct current and having a rotor with a central bore comprising a disk fastened to one end of the rotor, the disk having a central bore that registers with the central bore of the rotor, a hub circumferentially disposed around the bore of the disk and a plurality of through holes in the hub to fasten the disk to the rotor, a plurality of airfoil shaped fan blades disposed on an outer periphery of the disk forming a fan for cooling the machine, a plurality of recesses disposed in a circular array on one side of the disk and the rectifier units being insulation encapsulated and disposed in the recesses, the rectifier units being fastened to the disk, each of the rectifier units having a heat transfer plate which engages the recess to transfer heat generated within the rectifier unit to the disk, which conducts the transferred heat to the fan blades, whereby when the rotor rotates cooling air flows over the fan blades and into the machine removing the transferred heat from the fan blades, the disk and the rectifier units.

2. The integrated heat sink and fan rectifier assembly for an electrical machine as set forth in claim 1, wherein the recesses that receive the rectifier units are sufficiently deep to position a center of gravity of the rectifier units within the recesses.

3. The integrated heat sink and fan rectifier assembly for an electrical machine as set forth in claim 1, wherein the heat transfer plates on rectifier units engage a bottom portion of the recesses.

4. The integrated heat sink and fan rectifier assembly for an electrical machine as set forth in claim 1, wherein the disk is made of a material that is a good conductor of heat.

5. An integrated heat sink and fan rectifier assembly for an electrical alternating current machine having at least one phase and at least two rectifier units connected to each phase, one rectifier unit allows positive current to flow there through and the other rectifier unit allows negative current to flow there through to convert the alternating current to direct current and having a rotor with a central bore comprising a disk fastened to one end of the rotor, the disk having a central bore that registers with the central bore of the rotor, a plurality of airfoil shaped fan blades disposed on an outer periphery of the disk forming a fan for cooling the machine, a plurality of recesses disposed in a circular array on one side of the disk and the rectifier units being insulation encapsulated and disposed in the recesses, the disk has a circular recess with two conductors disposed therein, one of the conductors is disposed axially inward of the other conductor, the conductors are insulated from each other and from the disk, one of the conductors is electrically connected to the rectifier unit that passes positive current and the other conductor is electrically connected to the rectifier unit that passes negative current, the rectifier units being fastened to the disk, each of the rectifier units having a heat transfer plate which engages the recess to transfer heat generated within the rectifier unit to the disk, which conducts the transferred heat to the fan blades, whereby when the rotor rotates cooling air flows over the fan blades and into the machine removing the transferred heat from the fan blades, the disk and the rectifier units.

6. The integrated heat sink and fan rectifier assembly for an electrical machine as set forth in claim 5, wherein the inner conductor forms a complete circle and the outer conductor forms a part of a circle.

7. The integrated heat sink and fan rectifier assembly for an electrical machine as set forth in claim 5, wherein the conductors disposed in the circular recess are electrically connected to windings encircling rotor poles to form electromagnetic rotor poles.

* * * * *

UNITED STATES PATENT AND TRADEMARK OFFICE
CERTIFICATE OF CORRECTION

PATENT NO.    : 5,998,893
DATED         : December 7, 1999
INVENTOR(S)   : John T. Fowler and Darrell R. Morrison It is certified that error appears in the above-identified patent and that said Letters Patent is hereby corrected as shown below:

<u>Title page,</u>
Add Item -- [73] Assignee: Emerson Electric Co. --

Signed and Sealed this

Sixth Day of May, 2003

JAMES E. ROGAN
*Director of the United States Patent and Trademark Office*